(12) United States Patent
Koseki et al.

(10) Patent No.: US 11,948,755 B2
(45) Date of Patent: Apr. 2, 2024

(54) ELECTRODE BODY, ELECTROLYTIC CAPACITOR PROVIDED WITH ELECTRODE BODY, AND METHOD FOR PRODUCING ELECTRODE BODY

(71) Applicant: NIPPON CHEMI-CON CORPORATION, Tokyo (JP)

(72) Inventors: Kazuya Koseki, Kanagawa (JP); Kazuma Okura, Tokyo (JP); Kazuhiro Nagahara, Kanagawa (JP)

(73) Assignee: NIPPON CHEMI-CON CORPORATION (JP)

( * ) Notice: Subject to any disclaimer, the term of this patent is extended or adjusted under 35 U.S.C. 154(b) by 168 days.

(21) Appl. No.: 17/614,088

(22) PCT Filed: Jun. 12, 2020

(86) PCT No.: PCT/JP2020/023160
§ 371 (c)(1),
(2) Date: Nov. 24, 2021

(87) PCT Pub. No.: WO2021/002174
PCT Pub. Date: Jan. 7, 2021

(65) Prior Publication Data
US 2022/0262576 A1 Aug. 18, 2022

(30) Foreign Application Priority Data
Jul. 4, 2019 (JP) .................. 2019-125487

(51) Int. Cl.
*H01G 9/042* (2006.01)
*H01G 9/00* (2006.01)
*H01G 9/15* (2006.01)

(52) U.S. Cl.
CPC .......... *H01G 9/042* (2013.01); *H01G 9/0029* (2013.01)

(58) Field of Classification Search
None
See application file for complete search history.

(56) References Cited

U.S. PATENT DOCUMENTS

| 8,124,474 B2 * | 2/2012 | Mori | ............ H01G 11/38 257/E21.011 |
| 2006/0139846 A1 * | 6/2006 | Mori | ............ H01G 11/38 361/272 |

(Continued)

FOREIGN PATENT DOCUMENTS

| JP | H0461109 A | 2/1992 |
| JP | 2000-353642 | 12/2000 |

(Continued)

OTHER PUBLICATIONS

International Search Report dated Sep. 1, 2020, and Written Opinion for International PCT Patent Application No. PCT/JP2020/023160, and English language translation.

(Continued)

*Primary Examiner* — Dion R. Ferguson
(74) *Attorney, Agent, or Firm* — SNELL & WILMER LLP (57) ABSTRACT

An electrode body which achieves not only high initial capacitance of an electrolyte capacitor but also achieves stable capacitance even after being exposed to high temperature environment, and the electrolyte capacitor including the electrode body are provided. The electrode body is used for a negative electrode of the electrolyte capacitor, and the electrode body includes a negative electrode foil formed by a valve action metal, and a carbon layer formed on the negative electrode foil. The carbon layer includes a first spherical carbon and a second spherical carbon, and the first spherical carbon has a BET specific surface area larger than the second spherical carbon.

20 Claims, 4 Drawing Sheets

(56) References Cited

U.S. PATENT DOCUMENTS

2011/0281170 A1 11/2011 Mitsuda et al.
2022/0262576 A1* 8/2022 Koseki .................. H01G 9/048

FOREIGN PATENT DOCUMENTS

| JP | 2005223197 A | | 8/2005 | |
|---|---|---|---|---|
| JP | 200680111 A | | 3/2006 | |
| KR | 20110042316 A | * | 4/2011 | |
| WO | WO-2004095480 A1 | * | 11/2004 | ............. H01G 9/155 |
| WO | WO2010116872 A1 | | 10/2010 | |
| WO | WO2015025663 A1 | | 2/2015 | |
| WO | WO-2020059609 A1 | * | 3/2020 | ............. H01G 9/042 |
| WO | WO-2021002174 A1 | * | 1/2021 | ........... H01G 9/0029 |
| WO | WO-2022045122 A1 | * | 3/2022 | |

OTHER PUBLICATIONS

Office Action dated May 29, 2023, for Corresponding Chinese Application No. 202080034086.3 with English language machine translation (10 pages).
Office Action dated Oct. 10, 2022 for Corresponding China Patent Application No. 202080034086.3 with English language machine translation.
Office Action dated Feb. 10, 2023, for Corresponding Japan Patent Application No. 2019-125487 with English language machine translation (6 pages).
Office Action dated Nov. 6, 2023, for Corresponding Taiwanese Application No. 109120493 with English language machine translation (7 pages).

* cited by examiner

Fig. 4

ELECTRODE BODY, ELECTROLYTIC CAPACITOR PROVIDED WITH ELECTRODE BODY, AND METHOD FOR PRODUCING ELECTRODE BODY

CROSS-REFERENCE TO RELATED APPLICATION

This application is a 371 National Stage Entry of PCT application PCT/JP2020/023160, filed Jun. 12, 2020, entitled "ELECTRODE BODY, ELECTROLYTIC CAPACITOR PROVIDED WITH ELECTRODE BODY, AND METHOD FOR PRODUCING ELECTRODE BODY", which is based upon and claims the benefit of priority from Japan Patent Application No. 2019-125487, filed on Jul. 4, 2019, both of which are hereby expressly incorporated by reference in their entireties.

FIELD OF INVENTION

The present disclosure relates to an electrode body, an electrolyte capacitor including the electrode body, and a method for producing the electrode body.

BACKGROUND

Electrolyte capacitors include valve action metal, such as tantalum and aluminum, as positive electrode foils and negative electrode foils. A surface of the positive electrode foil is enlarged by sintering or etching the valve action metal, and the enlarged surface has a dielectric oxide film layer. Electrolyte solution exists between the positive electrode foil and the negative electrode foil. The electrolyte solution closely contacts the uneven surface of the positive electrode foil and acts as the true negative electrode. The electrolyte capacitor obtains the positive-electrode-side capacity by dielectric polarization of the dielectric oxide film layer.

The electrolyte capacitor can be regarded as a series capacitor in which the capacity is shown at the positive-electrode side and the negative-electrode side. Therefore, the negative-electrode-side capacity is very important to efficiently utilize the positive-electrode-side capacity. Although a surface area of the negative electrode foil is also enlarged by an etching process, there is a limit for the enlargement of the surface of the negative electrode foil in view of the thickness of the negative electrode foil.

Accordingly, an electrolyte capacitor in which a film of metal nitrides such as titanium nitride is formed on the negative electrode foil is suggested (refer Patent Document 1). Under the nitrogen gas atmosphere, titanium is evaporated and titanium nitride is deposited on the surface of the negative electrode foil by vacuum arc deposition method that is one of ion plating schemes. Metal nitrides are inert such that it is difficult for natural oxides films to be formed. In addition, fine unevennesses are formed on the deposited film such that the surface area of the negative electrode film increases.

Furthermore, an electrolyte capacitor in which a porous carbon layer including activated carbons is formed on the negative electrode foil is known (refer Patent Document 2). The negative-electrode-side capacity of this electrolyte capacitor is shown by electricity storage effect of an electric double layer formed on an interface between a polar electrode and an electrolyte. Cations of the electrolyte are aligned at the interface between the electrolyte and the porous carbon layer and form a pair with electrons in the carbon layer via extremely small distance therebetween, and a potential barrier is formed in the negative electrode foil. The negative electrode foil on which the porous carbon layer is formed is produced by kneading an aqueous binder solution in which porous carbon is dispersed to be pasty, applying the paste on the surface of the negative electrode foil, and drying the foil in high temperature.

PRIOR ART DOCUMENT

Patent Document

Patent Document 1: Japanese Laid-Open Application H4-61109

Patent Document 2: Japanese Laid-Open Application 2006-80111

SUMMARY OF INVENTION

Problems to be Solved by Invention

A deposition process of metal nitrides is complicated and increases cost of the electrolyte capacitor. In addition, recent electrolyte capacitors are expected to be used in broad temperature zones from low temperature environment to high temperature environment, like in-vehicle application. However, if the electrolyte capacitor in which the metal nitride film is formed on the negative electrode foil is exposed to high temperature for a long time, the capacitance of the electrolyte capacitor largely decreases. Accordingly, the capacitance of the electrolyte capacitor may largely differ from what it was initially expected to have.

In the electrolyte capacitor in which the porous carbon layer including activated carbons is formed on the negative electrode foil by applying pastes, the capacitance and the decreasing rate of the capacitance under low temperature environment are in the trade-off relationship and are not compatible. That is, the capacitance of the electrolyte capacitor with high capacitance largely decreases under low temperature environment, and the capacitance of the electrolyte capacitor, in which a decrease in the capacitance under high temperature environment is low, is small.

The present disclosure is suggested to address the above problems, and the objective is to provide an electrode body which has high capacitance and which shows stable capacitance even after being exposed to high temperature environment, and an electrolyte capacitor including the electrode body.

Means to Solve the Problem

The inventors have well-studied and found that, when mixing a spherical carbon with relatively large BET specific surface area and a carbon with relatively small BET specific surface area to form a carbon layer, a decrease in capacitance when exposed to high temperature environment can be suppressed compared with an electrolyte capacitor in which a metal nitride film is formed on a negative electrode foil. That is, the inventors found an electrolyte capacitor in which the capacitance is equal to or greater than that of the electrolyte capacitor in which a metal nitride film is formed on a negative electrode foil and in which the decrease in the capacitance is suppressed when compared with the electrolyte capacitor in which a metal nitride film is formed on a negative electrode foil even when exposed to high temperature environment.

The present disclosure is achieved based on the above findings, and to address the above problems, the present disclosure is an electrode body used for a negative electrode of an electrolyte capacitor, and the electrode body includes:

a negative electrode foil formed by a valve action metal; and a carbon layer formed on the negative electrode foil, in which:

the carbon layer includes a first spherical carbon and a second spherical carbon, and the first spherical carbon has a BET specific surface area larger than the second spherical carbon.

A mixture ratio (A:B) of the first spherical carbon (A) and the second spherical carbon (B) may be from 90:10 to 30:70.

An enlarged surface layer may be formed on a surface of the negative electrode foil, and the carbon layer may be formed on the enlarged surface layer.

The enlarged surface layer and the carbon layer may be pressure-welded to each other, and the carbon layer may enter the enlarged surface layer.

Concave and convex shape may be formed in an interface between the enlarged surface layer and the carbon layer, and the concave and convex shape may be compressed and deformed by pressing.

An aspect of the present disclosure also includes the electrolyte capacitor in which the negative electrode includes the electrode body.

Also, in order to address the above problems, a method for producing an electrode body according to the present disclosure is a method for producing an electrode body used for a negative electrode of an electrolyte capacitor, the method includes:

forming a carbon layer on a negative electrode foil which is formed by a valve action metal and which an enlarged surface layer is formed on a surface thereof; and pressing the carbon layer on the negative electrode foil, in which:

the carbon layer includes a first spherical carbon and a second spherical carbon, and the first spherical carbon has a BET specific surface area larger than the second spherical carbon.

Effect of Invention

According to the present disclosure, the negative electrode body shows high capacitance and stable capacitance even after being exposed to high temperature environment.

EMBODIMENTS

An electrode body according to the present disclosure and an electrolyte capacitor using the electrode body for a negative electrode will be described. In the present embodiments, the electrolyte capacitor including an electrolytic solution is described as an example, however, it is not limited thereto. The electrode body may be applied to electrolyte capacitors including electrolytic solution, solid electrolyte layers such as conductive polymers, gel electrolytes, or electrolytes in which electrolytic solution is used together with solid electrolyte layers and gel electrolytes.

(Electrolyte Capacitor)

An electrolyte capacitor is a passive element which stores and discharges electrical charge according to capacitance. The electrolyte capacitor has a wound-type or laminated-type capacitor element. The capacitor element is formed by arranging the electrode bodies to face each other via a separator and impregnating the electrode bodies with the electrolytic solution. In the electrolyte capacitor, negative-electrode-side capacity is produced by the electric double-layer effect occurring at an interface between the electrode body used at the negative-electrode side and the electrolytic solution. In addition, positive-electrode-side capacity is produced by the dielectric polarization effect at the electrode body used at the positive-electrode side. In below, the electrode body used at the negative-electrode side is referred to as a negative electrode body and the electrode body used at the positive-electrode side is referred to as a positive electrode foil.

A dielectric oxide film layer where the dielectric polarization effect occurs is formed on a surface of the positive electrode foil. A carbon layer where causes the electric double-layer effect to occur at the negative electrode body and the electrolytic solution on a surface of the negative electrode body. The electrolytic solution is present between the positive electrode foil and the negative electrode body, and closely contacts the dielectric oxide film layer of the positive electrode foil and the carbon layer of the negative electrode body. The separator is present between the positive electrode foil and the negative electrode body, and retains the electrolytic solution, to prevent short-circuit of the positive electrode foil and the negative electrode body.

(Negative Electrode Body)

The negative electrode body has two-layered structures of a negative electrode foil and the carbon layer. The negative electrode foil becomes a current-collector, and it is preferable that an enlarged surface layer is formed on a surface of the negative electrode foil. The carbon layer includes carbon material as the main material. The carbon layer and the enlarged surface layer closely contact each other to form the two-layered structure of the negative electrode foil and the carbon layer.

The negative electrode foil is a long foil body formed of valve action metal. The valve action metal may be aluminum, tantalum, niobium, titanium, hafnium, zirconium, zinc, tungsten, bismuth, and antimon, etc. The purity of the valve action metal is preferably equal to or more than about 99%, however, impurities such as silicon, iron, copper, magnesium, and zinc may be included. For the negative electrode foil, for example, so-called. H material that is aluminum material which has the thermal refining symbol of H defined by JIS H0001, and so-called O material that is aluminum material which has the thermal refining symbol of O defined by JIS H0001 may be used. When the metal foil with high rigidity formed of H material is used, the deformation of the negative electrode foil due to a pressing process described later can be suppressed.

The valve action metal is extended, and an enlargement process is performed to a surface of the valve action metal to form the negative electrode foil. The enlarged surface layer is formed by electrolytic etching, chemical etching, or sandblasting, etc., or is formed by vapor depositing or sintering metal particles etc., to the metal foil. The electrolytic etching may be DC etching or AC etching, etc. In addition, in the chemical etching, the metal foil is immersed in acidic solution or alkaline solution. The formed enlarged surface layer is a layer region having tunnel-shaped etching pits dug from a foil surface toward a foil core, or spongy etching pits. Note that the etching pit may be formed to penetrate the negative electrode foil.

In the carbon layer, the carbon material is a mixture of spherical carbons with different specific surface area calculated by BET theory (hereinafter, referred to as BET specific surface area). One of the spherical carbons with BET specific surface larger than the other of spherical carbons is called a large specific surface spherical carbon. Also, the other of the spherical carbons with BET specific surface smaller than the large specific surface spherical carbon is called a small specific surface spherical carbon. For example, the large specific surface spherical carbon and the small specific surface spherical carbon may be carbon black. The carbon black may be ketjen black, acetylene black, furnace black, channel black, and thermal black, etc. Combinations of types of the large specific surface spherical carbon and the small specific surface spherical carbon are not particularly limited.

The carbon layer formed by mixing the large specific surface spherical carbon and the small specific surface spherical carbon becomes an electric double-layer active material layer shows the negative-electrode-side capacity with the large specific surface spherical carbon and the small specific surface spherical carbon as the active material. Accordingly, high capacitance of large specific surface spherical carbon and excellent thermal stability of the small specific surface spherical carbon revealed, and demerits of the two are complemented. That is, the combination of the large specific surface spherical carbon and the small specific surface spherical carbon has high capacitance and reduces the difference between the initial capacitance and the capacitance after being exposed to high temperature environment, that is, the capacitance change rate, even when the electrolyte capacitor is used at low frequency range and high frequency range compared with an electrolyte capacitor in which a film of metal nitrides is formed on the negative electrode foil.

The initial capacitance is capacitance at normal temperature, such as around 20° C., after the electrolyte capacitor is assembled has undergone an aging process, and the capacitance after being exposed to high temperature environment is capacitance after being exposed, for example, to high temperature environment of 125° C. for a long time such as 278 hours. The capacitance change rate is a change rated of the capacitance after being exposed to high temperature environment relative to the initial capacitance.

Note that a lower limit of the BET specific surface area of the large specific surface spherical carbon, an upper limit of the BET specific surface area of the small specific surface spherical carbon, a difference between the BET specific surface area of the large specific surface spherical carbon and the small specific surface spherical carbon, a ratio of the BET specific surface area of the large specific surface spherical carbon and the small specific surface spherical carbon, and primary particle diameters of t the large specific surface spherical carbon and the small specific surface spherical carbon are not particularly limited.

However, a mixture ratio (A:B) of the large specific surface spherical carbon (A) and the small specific surface spherical carbon (B) is preferably 90:10 to 30:70. When mixing the small specific surface spherical carbon in an amount of equal to or more than the mixture ratio of 90:10, the capacitance change rate in high temperature environment and at high frequency range can be further suppressed. Meanwhile, when mixing the small specific surface spherical carbon in an amount of equal to or more than the mixture ratio of 30:70, the initial capacitance may become small depending on the combination of the large specific surface spherical carbon and the small specific surface spherical carbon compared with when the small specific surface spherical carbon in an amount of equal to or less than the mixture ratio of 30:70. Note that the mixture ratio is a configuration ratio of carbon components included in solid components in the carbon layer.

Furthermore, the BET specific surface area of the large specific surface spherical carbon is preferably equal to or more than 133 $m^2/g$ and equal to or less than 1270 $m^2/g$, and is more preferably equal to or more than 133 $m^2/g$ and equal to or less than 800 $m^2/g$. Also, the BET specific surface area of the small specific surface spherical carbon is preferably equal to or more than 39 $m^2/g$ and equal to or less than 377 $m^2/g$, and is more preferably equal to or more than 39 $m^2/g$ and equal to or less than 254 $m^2/g$.

As the carbon material, the large specific surface spherical carbon and the small specific surface spherical carbon are mainly used, and other material such as little amount of activated carbon and carbon nanotube may be included. The specific surface area of the activated carbon and the carbon nanotube is large because pi electrons are delocalized. Furthermore, other spherical carbon with BET specific surface area in between the large specific surface spherical carbon and the small specific surface spherical carbon may be further added.

The negative electrode body may be formed by producing slurry including material of the carbon layer, forming the enlarged surface layer on the negative electrode foil, then applying the slurry on the enlarged surface area, and drying and pressing the negative electrode foil. Typically, the enlarged surface area layer is formed by DC etching or AC etching in which DC or Ac is applied to the negative electrode foil in acidic aqueous solution such as nitric acid, sulfuric acid, and hydrochloric acid.

Regarding the carbon layer, firstly, powder of the large specific surface spherical carbon and the small specific surface spherical carbon is dispersed in solution. A dispersant such as sodium carboxymethyl cellulose (CMC-Na) may be included in the solution to facilitate the dispersion, and the solution may be stirred and air contaminated in the solution by stirring may be defoamed to improve the degree of dispersion. After the dispersion is completed, a binder is added to the solution, and the solution is further stirred or stirred and defoamed to produce the slurry. Other solution may be added as appropriate. Then, the slurry is applied on the enlarged surface layer, and the enlarged surface layer is dried, and then pressed by the predetermined pressure to layer the carbon layer on the enlarged surface area.

By pressing, the carbon layer is compressed, and air gaps in the carbon layer can be easily eliminated. By eliminating the air gaps in the carbon layer, the carbon layer becomes dense and adhesion of the carbon layer is ensured. Furthermore, an interface between the carbon layer and the enlarged surface layer becomes an uneven-shape by the pressing, such that the adhered area of the carbon layer and the enlarged surface layer increases, and the capacitance increased. In addition, by the pressing, the carbon layer is pressure-welded to and enters the enlarged surface layer, for example, like the carbon layer entering as far as the etching pits of the enlarged surface area, further improving the adhesion such that the resistance tends to become low.

Solvent is alcohols such as methanol, ethanol, and 2-propanol, hydrocarbon solvent, aromatic solvent, amide solvent such as N-methyl-2-pyrrolidone (NMP) and N,N-dimethylformamide (DMF), water, and, mixtures thereof. As a dispersion method, mixers, jet mixing (jet impingement), ultracentrifugation, or others such as ultrasonic processing, etc., are used. The binder may be styrene-butadiene rubber, vinylidene polyfluoride, or polytetrafluoroethylene.

When performing porous treatment such as activation processing and aperture processing to the large specific surface spherical carbon and the small specific surface spherical carbon, conventionally known activation processing such as gas activation processing and chemical activation processing may be used. Gas used in the gas activation processing may be water vapor, air, carbon monoxide, carbon dioxide, hydrogen chloride, oxygen, or combinations thereof. Chemical agents used in the chemical processing may be hydroxides of alkali metal such as sodium hydroxide and potassium hydroxide, hydroxides of alkali earth metal, such as calcium hydroxide, inorganic acid such as boric acid, phosphoric acid, sulfuric acid, and hydrochloric acid, and inorganic salts such as zinc chloride. Heat processing is performed at the time of activation processing as necessary.

(Positive Electrode Foil)

Next, the positive electrode foil is a long foil body formed of valve action metal. The purity of the positive electrode foil is desirably about 99.9%. The positive electrode foil is formed by etching an extended foil, or formed by sintering powder of the valve action metal, or formed by vapor depositing a film of metal particles, etc., on a foil. The surface of the positive electrode foil has an enlarged surface layer or a porous structure layer.

Typically, the dielectric oxide film layer formed on the positive electrode foil is an oxide film formed on a surface layer of the positive electrode foil, and when the positive electrode foil is formed of aluminum, the dielectric oxide film layer is an oxidized aluminum layer which is an oxidized porous structure region. The dielectric oxide film layer is formed by chemical treatment in which voltage is applied in solution without halogen ions, such as acid like ammonium borate, ammonium phosphate, and ammonium adipate, or acidic aqueous solution thereof. Note that a natural oxide film layer may be formed on the negative electrode foil, or the dielectric oxide film layer may be intentionally formed on the negative electrode foil.

(Separator)

The separator may be cellulose such as kraft, manila hemp, esparto, hemp, rayon, and combination papers thereof, polyester-based resins such as polyethylene terephthalate, polybutylene terephthalate, polyethylene naphthalate, and derivatives thereof, polytetrafluoroethylene-based resins, poly vinylidene fluoride-based resins, vinylon-based resins, polyamide-based resins such as aliphatic polyamide, semi-aromatic polyamide, and fully aromatic polyamide, polyimide-based resins, polyethylene resins, polypropylene resins, trimethylpentane resins, polyphenylene sulfide-based resins, and acryl resins. These resins may be used in single or in combination, or may be mixed and used with cellulose.

(Electrolytic Solution)

The electrolytic solution is mixture solution in which solutes are dissolved in solvents and to which additives are added if necessary. The solvent may be water, protic polar solvents, or protic polar solvents. Representatively, the protic polar solvent may be monohydric alcohols, polyhydric alcohols, oxyalcohol compounds, and water. Representatively, the aprotic polar solvent may be sulfones, amides, lactones, cyclic amides, nitriles, and oxides.

The monohydric alcohol may be ethanol, propanol, butanol, pentanol, hexanol, cyclobutanol, cyclopentanol, cyclohexanol, and benzyl alcohol. The polyhydric alcohol and the oxyalcohol compound may be ethylene glycol, propylene glycol, glycerin, methyl cellosolve, ethyl cellosolve, methoxypropylene glycol, and dlmethoxy propanol. The sulfone may be dimethylsulfone, ethylmethylsulfone, diethylsulfone, sulfolane, 3-methylsulfone, and 2,4-dimethylsulfolane. The amide may be N-methylformamide, N,N-dimethylformamide, N-ethylformamide, N,N-diethylformamide, N-methylacetamide, N,N-dimethylacetamide, N-ethylacetamide, N,N-diethyl acetamide, and hexamethylphosphoricamide. The lactone and the cyclic amide may be γ-butyrolactone, γ-valerolactone, δ-valerolavtone, N-methyl-2-pyrrolidone, ethylene carbonate, propylene carbonate, butylene carbonate, and isobutylene carbonate. The nitrile may be acetonitrile, 3-methoxypropionitrile, and glutaronitrile. The oxides may be dimethyl sulfoxide. These may be used as the solvent in single or in combination of two or more.

The solute included in the electrolytic solution includes anion components and cation components, and typically, the components are organic acid or salts thereof, inorganic acid or salts thereof, or composite compound of organic acid and inorganic acid or ion dissociative salts thereof. The components are used in single or in combination. The acid that is the anion and the base that is the cation may be separately added to the electrolytic solution as the solute components.

The organic acid that is the anion component in the electrolytic solution may be carboxylic acid such as oxalic acid, succinic acid, glutaric acid, pimelic acid, suberic acid, sebacic acid, phthalic acid, isophthalic acid, terephthalic acid, maleic acid, adipic acid, benzoic acid, toluic acid, enanthic acid, malonic acid, 1,6-decanedicarboxylic acid, 1,7-octanedicarboxylic acid, azelaic acid, undecanedioic acid, dodecanedioic acid, and tridecanedioic acid, phenols, and sulfones. In addition, the inorganic acid may be boric acid, phosphoric acid, phosphorus acid, hypo phosphorus acid, carbonic acid, and silicic acid, the composite compound of organic acid and inorganic acid may be borodisalicylic acid, borodioxalic acid, and borodiglycolic acid.

At least one salt of the organic acid, the inorganic acid, and the composite compound of organic acid and inorganic acid may be ammonium salts, quaternary ammonium salts, quaternarized aminidium salts, amine salts, sodium salts, and potassium salts. Quaternary ammonium ions of the quaternary ammonium salt may be tetramethylammonium, triethylmethylammonium, and tetraethylammonium. The quaternized aminidium salt may be ethyldimethylimidazolium and tetramethylimidazolium. Amines of the amine salt may be primary amines, secondary amines, and tertiary amines. The primary amine may be methylamine, ethylamine, and propylamine. The secondary amine may be dimethylamine, diethylamine, ethylmethylamine, and dibutylamine. The tertiary amine may be trimethylamine, triethylamine, tributylamine, ethyldimethylamine, and ethyldiisopropylamine.

Furthermore, other additives may be added to the electrolytic solution. The additive may be polyethylene glycol, complex compounds of boric acid and polysaccharides (such as mannitol and sorbitol), complex compounds of boric acid and polyhydric alcohol, boric acid esters, nitro compounds (such as o-nitrobenzoic acid, m-nitrobenzoic acid, p-nitrobenzoic acid, o-nitrophenol, m-nitrophenol, and p-nitrophenol), phosphoric acid esters, and colloidal silica. The additive may be added in single or in combination of two or more.

The electrolytic capacitor using the electrolytic solution is described above, however, when the solid electrolyte is used, the solid electrolyte is conducted by the carbon layer in contact with the current collector, and the capacitance of the electrolyte capacitor is formed by the positive-electrode-side capacity due to the dielectric polarization effect. In addition, when the solid electrolyte may be conductive polymers such polythiophenes like polyethylenedioxythiophene, polypyrroles, and polyanilines.

EMBODIMENT

In below, the present disclosure is described in more detail based on examples. Note that the present disclosure is not limited to the below examples. Firstly, electrolyte capacitors of reference examples and comparative example 1 were produced in an aspect of laminated cells as described below.

The common producing procedures for the electrolyte capacitor was as follows. Firstly, for the negative electrode body, to produce a dispersant-containing aqueous solution, carbon material was added to CMC-Na aqueous solution. In the dispersant-containing aqueous solution, 1.67 wt % of CMC-Na relative to the entire aqueous solution excepting the carbon material was included. After the carbon material was added, to perform dispersion processing, the aqueous solution was stirred for three minutes at rotation speed of 2000 rpm by a mixer (THINKY MIXER from THINKY COPORATION), was defoamed for 30 seconds at 2500 rpm by the mixer (THINKY MIXER from THINKY COPORATION), and then was stirred for three minutes at rotation speed of 2000 rpm by the mixer (THINKY MIXER from THINKY COPORATION).

After the dispersion processing of the carbon material, water and 2-propanol were added as solvents, and the dispersion processing was performed again to adjust the carbon material solid content concentration to be a predetermined amount. After the dilution by the addition of the solvents, SBR (BM-400B from ZEON CORPORATION) aqueous solution was added as a binder and was mixed to produce a slurry. SBR occupied 40 wt % of the SBR aqueous solution. A formulation ratio (A:B:C) of the carbon material (A), the binder (B), and CMC-Na (C) in the produced slurry was 84:10:6. A formulation ratio (A:B) of water (A) and 2-propanol (B) was 87:13. Also in the dispersion processing performed again, similarly to the dispersion processing, the aqueous solution was stirred for three minutes at rotation speed of 2000 rpm by a mixer (THINKY MIXER from THINKY COPORATION), was defoamed for 30 seconds at 2500 rpm by the mixer (THINKY MIXER from THINKY COPORATION), and then was stirred for three minutes at rotation speed of 2000 rpm by the mixer (THINKY MIXER from THINKY COPORATION).

Meanwhile, an aluminum foil from which an electrode lead plate had been drawn out was prepared as a negative electrode foil, and the slurry was uniformly applied on the negative electrode foil. Current was applied to the negative electrode foil in hydrochloric acid beforehand to form an enlarged surface layer. The slurry was applied on the enlarged surface area. Then, after the slurry was dried, pressure of 150 kNcm$^{-2}$ was applied by vertical pressing to fox the carbon layer on the negative electrode foil.

Furthermore, etching processing was performed on the aluminum foil to form a dielectric oxide film layer with nominal chemical voltage of 4 $V_{fs}$ and obtain, the aluminum foil with projected area of 2.1 cm$^2$ as the positive electrode foil. The capacity of the positive electrode foil was 386 µFcm$^{-2}$. Then the negative electrode body and the positive electrode foil were arranged to face each other via a rayon separator, were impregnated with electrolytic solution to produce a laminated cell with rated voltage of 2.9 V, and the common chemical processing was performed again. The electrolytic solution was produced by using tetramethylimidazolinium phthalic acid as a solute and γ-butyrolactone as a solvent. In the chemical processing performed again, current of 3.35 V was applied to all electrolyte capacitors for 60 minutes under an environment of 105° C.

Differences between the examples and the reference examples were the carbon material, and the carbon material and formulation ratio in the examples and the reference examples are described in Table 1 below. In Table 1, CB1 and CB2 indicate spherical carbons. In Table 1, a spherical carbon with BET specific surface area of 39 m$^2$/g is acetylene black (HS-100 from Denka Company Limited), a spherical carbon with BET specific surface area of 133 m$^2$/g is acetylene black (FX-35 from Denka Company Limited), a spherical carbon with BET specific surface area of 254 m$^2$/g is furnace black (XC-72 from Cabot Corporation), a spherical carbon with BET specific surface area of 377 m$^2$/g is ketjen black (EC200L from Lion Corporation), a spherical carbon with BET specific surface area of 800 m$^2$/g is ketjen black (EC300J from Lion Corporation), and a spherical carbon with BET specific surface area of 1270 m$^2$/g is ketjen black (EC600JD from Lion Corporation).

TABLE 1

| | BET Specific Surface Area of Spehrical Carbon (CB1) [m$^2$/g] | BET Specific Surface Area of Spehrical Carbon (CB2) [m$^2$/g] | Mixture Ratio (CB1:CB2) |
|---|---|---|---|
| Example 1 | 800 | | 90:10 |
| Example 2 | | | 70:30 |
| Example 3 | | | 50:50 |
| Example 4 | | | 30:70 |
| Example 5 | | | 10:90 |
| Example 6 | 800 | 377 | 90:10 |
| Example 7 | | | 70:30 |
| Example 8 | | | 50:50 |
| Example 9 | | | 30:70 |
| Example 10 | | | 10:90 |
| Example 11 | 1270 | 30 | 10:90 |
| Reference Example 1 | 39 | — | 100:0 |
| Reference Example 2 | 133 | — | 100:0 |
| Reference Example 3 | 254 | — | 100:0 |
| Reference Example 4 | 377 | — | 100:0 |
| Reference Example 5 | 800 | — | 100:0 |
| Reference Example 6 | 1270 | — | 100:0 |
| Reference Example 7 | Titanium Nitride (TiN) | | |

A electrolyte capacitor of the comparative example 1 was produces as follows as the laminated cell. That is, an aluminum foil which had not been processed by etching was used as current collectors, a titanium nitride layer was formed on the aluminum foil by electron beam deposition, and the aluminum foil on which the titanium nitride layer had been formed was used as the negative electrode body. A positive electrode foil, composition of separator and electrolytic solution, and the producing method and condition were the same as the electrolyte capacitors of the respective examples.

(Product Test)

Capacitance of the electrolyte capacitors of the examples, the reference examples, and the comparative example 1 was measured. In a product test, capacitance (Cap) at the time of charging and discharging 120 Hz and 10 kHz at 20° C. was measured as the initial capacitance. Also, capacitance (Cap) at the time of charging and discharging 120 Hz and 10 kHz at 20° C. after applying a load of 2.4 V for 278 hours at high temperature environment of 125° C. was measured as the capacitance after being exposed high temperature environment. The result was indicated in below Tables 2 and 3. Tables 2 and 3 indicate change rates (ΔCap) of the capacitance after being exposed high temperature environment relative to the initial capacitance for each frequency.

Figure 2:
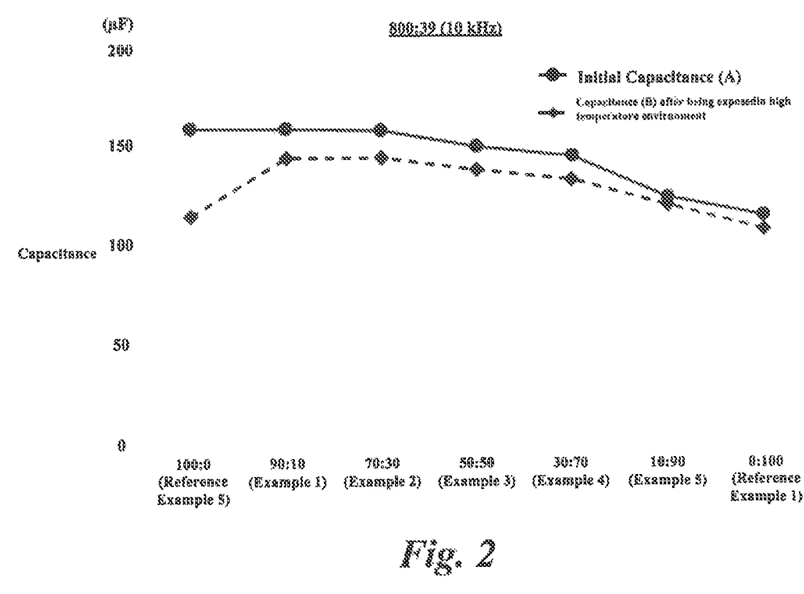
FIG. 2 is a graph indicating capacitance at high frequency range when mixing a large surface area spherical carbon with BET specific surface area of 800 $m^2/g$ and a small surface area spherical carbon with BET specific surface area of 39 $m^2/g$ at various mixture ratio.
Figure 3:
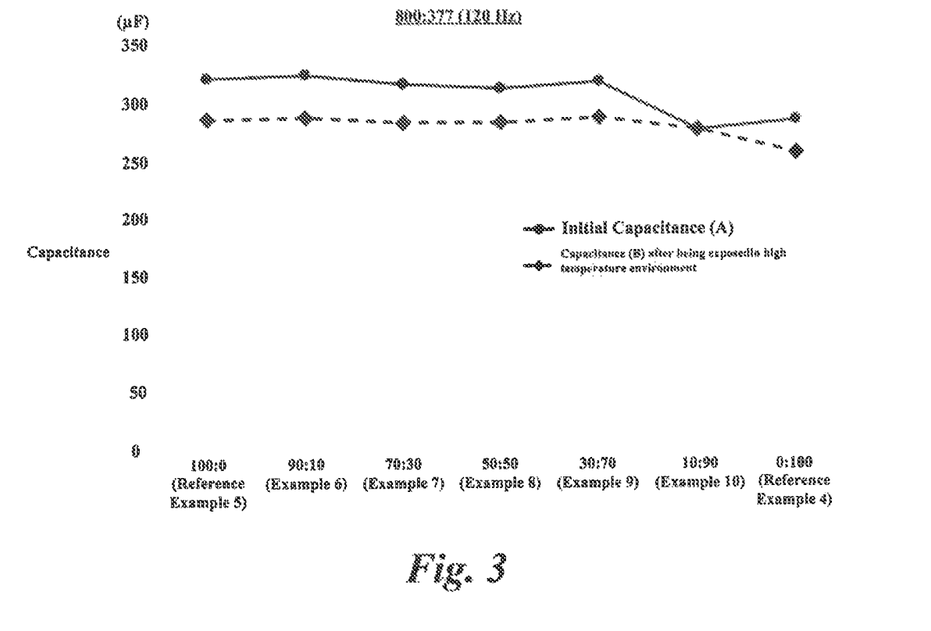
FIG. 3 is a graph indicating capacitance at low frequency range when mixing a large surface area spherical carbon with BET specific surface area of 800 $m^3/g$ and a small surface area spherical carbon with BET specific surface area of 377 $m^2/g$ at various mixture ratio.
Figure 4:
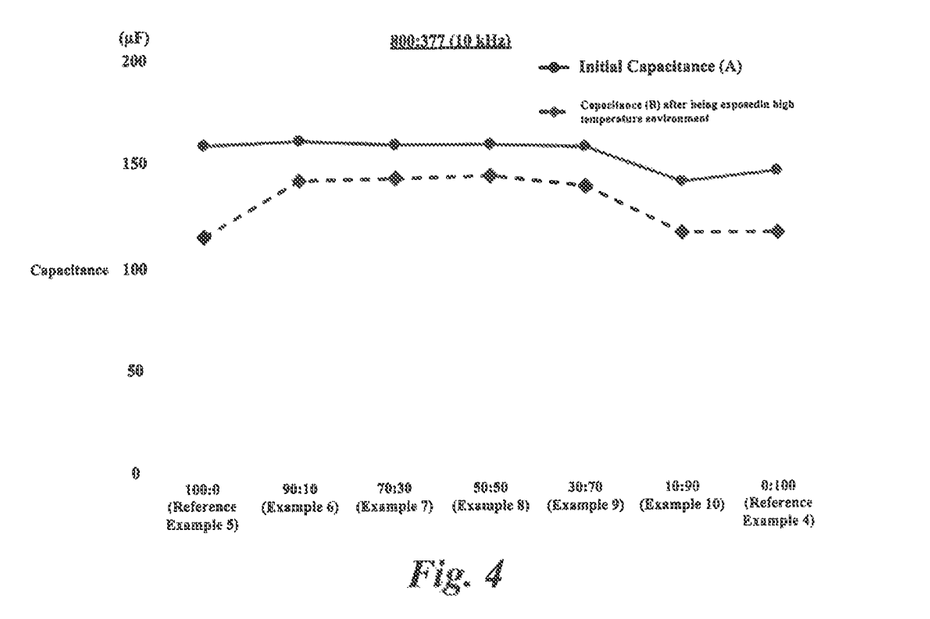
FIG. 4 is a graph indicating capacitance at high frequency range when mixing a large surface area spherical carbon with BET specific surface area of 800 $m^2/g$ and a small surface area spherical carbon with BET specific surface area of 377 $m^2/g$ at various mixture ratio.

FIG. 2 is a graph indicating the initial capacitance and the capacitance after being exposed high temperature environment in the examples 1 to 5 and the reference examples 1 and 5 at high frequency range in an order of the mixture ratio. FIG. 3 is a graph indicating the initial capacitance and the capacitance after being exposed high temperature environment in the examples 6 to 10 and the reference examples 4 and 5 at low frequency range in an order of the mixture ratio. FIG. 4 is a graph indicating the initial capacitance and the capacitance after being exposed high temperature environment in the examples 6 to 10 and the reference examples 4 and 5 at high frequency range in an order of the mixture ratio.

As indicated in Table 2, it was observed that the examples 1 to 11 were more excellent than the comparative example 1 in all of the initial capacitance at low frequency range, the initial capacitance at high frequency range, the capacitance at low frequency range after being exposed high temperature environment, the capacitance at high frequency range after being exposed high temperature environment, the change rate of the capacitance after being exposed high temperature environment relative to the initial capacitance at low fre-

TABLE 2

| | Spherical Carbon (CB1) | Spherical Carbon (CB2) | Mixture Ratio | Initial Capacitance Cap(μF): A | | Capacitance After Being Exposed in High Temperature Environment Cap(μF): B | | ΔCap (B/A × 100) [%] | |
|---|---|---|---|---|---|---|---|---|---|
| | [m²/g] | [m²/g] | (CB1:CB2) | 120 Hz | 10 kHz | 120 Hz | 10 kHz | 120 Hz | 10 kHz |
| Reference Example 5 | 800 | — | 100:0 | 321 | 159 | 285 | 115 | −10.8 | −28.1 |
| Example 1 | 800 | 39 | 99:10 | 337 | 189 | 302 | 144 | −10.4 | −0.3 |
| Example 2 | | | 70:30 | 339 | 138 | 300 | 144 | −11.6 | −9.9 |
| Example 3 | | | 50:50 | 318 | 150 | 186 | 138 | −0.8 | −0.3 |
| Example 4 | | | 30:70 | 283 | 145 | 256 | 133 | −0.4 | −0.4 |
| Example 5 | | | 10:90 | 238 | 124 | 218 | 126 | −0.3 | −1.5 |
| Reference Example 1 | 39 | — | 100:0 | 197 | 115 | 189 | 189 | −4.5 | −4.5 |
| Example 6 | 800 | 377 | 90:10 | 324 | 161 | 287 | 142 | −11.8 | −11.6 |
| Example 7 | | | 70:30 | 316 | 159 | 283 | 143 | −10.5 | −9.6 |
| Example 8 | | | 50:50 | 312 | 138 | 363 | 144 | −9.3 | −9.1 |
| Example 9 | | | 30:70 | 318 | 150 | 287 | 139 | −9.8 | −11.7 |
| Example 10 | | | 10:90 | 277 | 141 | 277 | 116 | −11.5 | −17.3 |
| Reference Example 4 | 377 | — | 100:0 | 365 | 146 | 287 | 116 | −9.8 | −20.3 |
| Example 11 | 1270 | 39 | 10:90 | 286 | 138 | 239 | 124 | −8.1 | −4.6 |
| Reference Example 8 | 1270 | — | 100:0 | 353 | 108 | 238 | 53 | −28.3 | −70.1 |
| Comparative Example 1 | Titanium Nitride (TiN) | | | 235 | 96 | 187 | 73 | −26.5 | −24.4 |

TABLE 3

| | BET Specific Surface Area | Initial Capacitance Cap(μF): A | | Capacitance After Being Exposed in High Temperature Environment Cap(μF): B | | ΔCap (B/A × 100) [%] | |
|---|---|---|---|---|---|---|---|
| | [m²/g] | 120 Hz | 10 kHz | 120 Hz | 10 kHz | 120 Hz | 10 kHz |
| Reference Example 1 | 39 | 197 | 115 | 189 | 108 | −4.3 | −6.5 |
| Reference Example 2 | 133 | 270 | 144 | 253 | 127 | −6.5 | −11.7 |
| Reference Example 3 | 254 | 287 | 149 | 261 | 130 | −9.1 | −12.7 |
| Reference Example 4 | 377 | 285 | 146 | 257 | 116 | −9.8 | −20.3 |
| Reference Example 5 | 800 | 321 | 159 | 286 | 115 | −10.8 | −28.1 |
| Reference Example 6 | 1270 | 333 | 108 | 238 | 32 | −28.3 | −70.1 |
| Comparative Example 1 | Titanium Nitride (TiN) | 235 | 96 | 187 | 73 | −20.5 | −24.4 |

Figure 1:
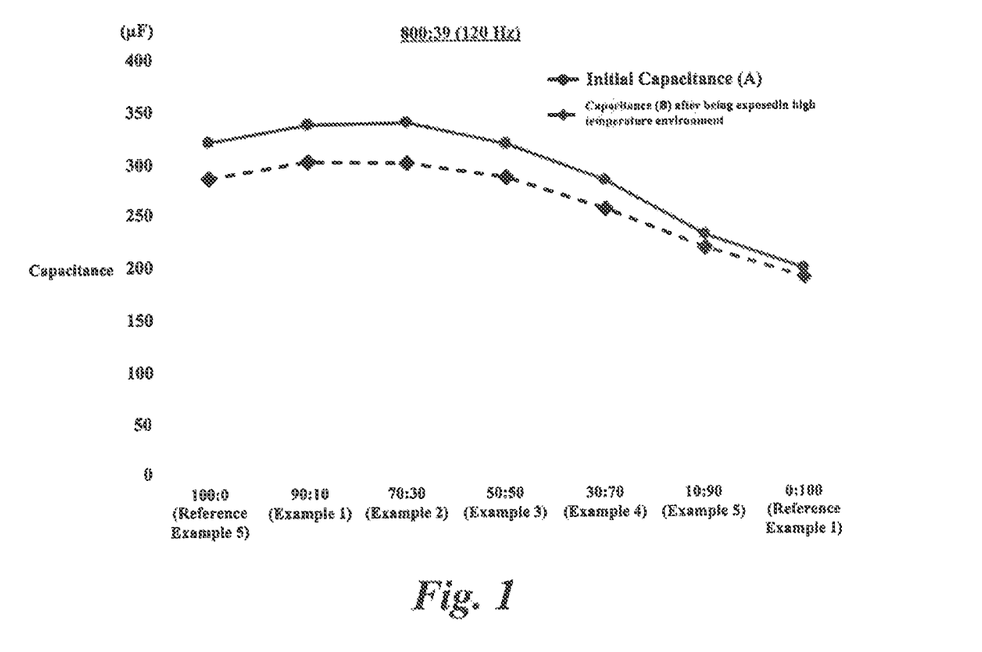
FIG. 1 is a graph indicating capacitance at low frequency range when mixing a large surface area spherical carbon with BET specific surface area of 800 $m^2/g$ and a small surface area spherical carbon with BET specific surface area of 39 $m^2/g$ at various mixture ratio.

Furthermore, based on the above two tables, FIGS. 1 to 4 are graphs indicating capacitance when the large specific surface spherical carbon and the small specific surface spherical carbon were mixed by various mixture ratio. FIG. 1 is a graph indicating the initial capacitance and the capacitance after being exposed high temperature environment in the examples 1 to 5 and the reference examples 1 and 5 at low frequency range in an order of the mixture ratio.

quency range, and the capacitance at high frequency range after being exposed high temperature environment, the change rate of the capacitance after being exposed high temperature environment relative to the initial capacitance at high frequency range.

In particular, as indicated in Table 2, although the examples 1 to 5 included the large surface area spherical carbon in the carbon layer similarly to the reference example 5, the examples 1 to 5 had dramatically excellent ΔCap comparable to the reference example 1 that did not include the large surface area spherical carbon at all. In addition, as illustrated in FIGS. 1 to 2, the capacitance in all examples 1 to 5 were equal to or more than the reference example 5 in the mixture ratio of 90:10 to 50:50. Note that it was observed that the capacitance only gradually decreased in the mixture ratio of 90:10 to 30:70 with the peak at 70:30 even if the ratio of the small surface area spherical carbon become larger.

Furthermore, as indicated in Table 2, although the examples 6 to 10 included the large surface area spherical carbon in the carbon layer similarly to the reference example 5, the examples 6 to 10 had dramatically excellent ΔCap exceeding the reference example 4 that did not include the large surface area spherical carbon at all. In addition, as illustrated in FIGS. 3 and 4, the capacitance of all examples 6 to 10 were equal to or more than the reference example 5 in the range up to the mixture ratio of 30:70.

That is, by mixing the large surface area spherical carbon which has high capacitance and in which ΔCap easily gets worse, and the small surface area spherical carbon in which the capacitance tends to become low and which has excellent ΔCap, it was observed that advantages of the large surface area spherical carbon and the small surface area spherical carbon were rather improved, complementing disadvantages of each other.

The invention claimed is:

1. An electrode body used for a negative electrode of an electrolyte capacitor, the electrode body comprising:
a negative electrode foil formed by a valve action metal; and
a carbon layer formed on the negative electrode foil, wherein:
the carbon layer includes a first spherical carbon and a second spherical carbon,
the first spherical carbon and the second spherical carbon are carbon black, and
the first spherical carbon has a BET specific surface area larger than the second spherical carbon.

2. The electrode body according to claim 1, wherein a mixture ratio (A:B) of the first spherical carbon (A) and the second spherical carbon (B) is from 90:10 to 30:70.

3. The electrode body according to claim 2, wherein:
an enlarged surface layer is formed on a surface of the negative electrode foil, and
the carbon layer is formed on the enlarged surface layer.

4. The electrode body according claim 3, wherein:
the enlarged surface layer and the carbon layer are pressure-welded to each other, and
the carbon layer enters the enlarged surface layer.

5. The electrode body according to claim 4, wherein:
concave and convex shape is formed in an interface between the enlarged surface layer and the carbon layer, and
the concave and convex shape is compressed and deformed by pressing.

6. The electrolyte capacitor comprising the negative electrode comprising the electrode body according to claim 4.

7. The electrode body according to claim 3, wherein:
concave and convex shape is formed in an interface between the enlarged surface layer and the carbon layer, and
the concave and convex shape is compressed and deformed by pressing.

8. The electrolyte capacitor comprising the negative electrode comprising the electrode body according to claim 7.

9. The electrolyte capacitor comprising the negative electrode comprising the electrode body according to claim 3.

10. The electrolyte capacitor comprising the negative electrode comprising the electrode body according to claim 2.

11. The electrode body according to claim 1, wherein:
an enlarged surface layer is formed on a surface of the negative electrode foil, and
the carbon layer is formed on the enlarged surface layer.

12. The electrode body according claim 11, wherein:
the enlarged surface layer and the carbon layer are pressure-welded to each other, and
the carbon layer enters the enlarged surface layer.

13. The electrode body according to claim 11, wherein:
concave and convex shape is formed in an interface between the enlarged surface layer and the carbon layer, and
the concave and convex shape is compressed and deformed by pressing.

14. The electrode body according to claim 12, wherein:
concave and convex shape is formed in an interface between the enlarged surface layer and the carbon layer, and
the concave and convex shape is compressed and deformed by pressing.

15. The electrolyte capacitor comprising the negative electrode comprising the electrode body according to claim 14.

16. The electrolyte capacitor comprising the negative electrode comprising the electrode body according to claim 12.

17. The electrolyte capacitor comprising the negative electrode comprising the electrode body according to claim 13.

18. The electrolyte capacitor comprising the negative electrode comprising the electrode body according to claim 11.

19. The electrolyte capacitor comprising the negative electrode comprising the electrode body according to claim 1.

20. A method for producing an electrode body used for a negative electrode of an electrolyte capacitor, the method comprising:
forming a carbon layer on a negative electrode foil which is formed by a valve action metal and which an enlarged surface layer is formed on a surface thereof; and
pressing the carbon layer on the negative electrode foil, wherein:
the carbon layer includes a first spherical carbon and a second spherical carbon,
the first spherical carbon and the second spherical carbon are carbon black, and
the first spherical carbon has a BET specific surface area larger than the second spherical carbon.

* * * * *